United States Patent
Lehto

(10) Patent No.: US 7,072,694 B2
(45) Date of Patent: Jul. 4, 2006

(54) MULTIPLE PAGE SOUND TONE DIALOG COMMUNICATION DEVICE

(75) Inventor: Laura Lehto, Tampere (FI)

(73) Assignee: Nokia Corporation, Espoo (FI)

( * ) Notice: Subject to any disclaimer, the term of this patent is extended or adjusted under 35 U.S.C. 154(b) by 235 days.

(21) Appl. No.: 10/785,425

(22) Filed: Feb. 23, 2004

(65) Prior Publication Data

US 2005/0197166 A1 Sep. 8, 2005

(51) Int. Cl.
  *H04B 1/38* (2006.01)
  *H04M 1/00* (2006.01)
  *H04M 3/00* (2006.01)
  *H04Q 7/20* (2006.01)

(52) U.S. Cl. .................. 455/567; 455/566; 455/456.6; 455/418; 455/419

(58) Field of Classification Search ................ 455/567, 455/566, 418, 419, 702
See application file for complete search history.

(56) References Cited

U.S. PATENT DOCUMENTS 6,597,279 B1 * 7/2003 Haraguchi ................. 340/7.2

2001/0053692 A1 * 12/2001 Ito et al. ..................... 455/425
2002/0094806 A1 * 7/2002 Kamimura ................... 455/415

OTHER PUBLICATIONS

User's Guide for Nokia 9210 Communicator, 9352303, Issue 4 EN, Nokia Corporation 1997-2001.

* cited by examiner

*Primary Examiner*—George Eng
*Assistant Examiner*—Wesley Kim

(57) ABSTRACT

This invention describes a novel methodology for using a multiple page dialog field for setting sound tasks in a communication device such a mobile device or a mobile phone. According to the present invention, the dialog/sounds are divided into multiple pages ("tabs"), for example, Ringing tones page, Message tones page, Alarms page, etc. The sounds are placed to different pages according to their purposes. The right page is opened using a setting page means which can be implemented as a default setting depending on from where the dialog is opened. However, if the user wishes to select a ringing tone sound from another page, e.g., the "message tone page", it is allowed and possible to do by going directly to that page from the previous page. Every page has a no-tone selection as well.

26 Claims, 3 Drawing Sheets

MULTIPLE PAGE SOUND TONE DIALOG COMMUNICATION DEVICE

FIELD OF THE INVENTION

This invention generally relates to communication devices such as mobile devices or mobile phones and more specifically to utilizing a multiple page dialog field for setting sound tasks in the communication devices.

BACKGROUND OF THE INVENTION

Normally all the sounds of the fixed sound set (ringing tones, message sounds, etc.) are listed in the same dialog "Fixed sounds dialog" in communication devices such as mobile devices and phones (e.g., Nokia communicator 9210i). The dialog is used in Profile settings when defining ringing tones for different purposes (calls, messages, calendar and clock alarms). All tones and sounds are in the same dialog. A similar dialog is used when assigning personal ringing tones in a Contact manager application.

However, sounds are designed for different purposes, i.e., to be used as ringing tones, messages sounds, clock alarms and calendar alarms, etc. When the sounds were listed alphabetically in a typical prior art fixed sound dialog, the user just had to figure out which sounds were meant for which purpose. A dialog containing all the sounds in the fixed sound set typically uses a very long selection list. Since the height of the screen is limited, the list required a lot of scrolling. A more efficient and user friendly methodology for setting appropriate ringing sound tones in the communication device is desired.

SUMMARY OF THE INVENTION

The object of the present invention is to provide a methodology for using a multiple page dialog field for setting sound tasks in a communication device such a mobile device or a mobile phone.

According to a first aspect of the invention, a method for using a multiple page dialog field for setting tasks in a communication device, comprises the steps of: opening said multiple page dialog field on one page with a page number i of K pages by a user using a setting page means, wherein said one page contains $N_i$ dedicated sound tone items with a predetermined purpose and presented only on said one page, and optionally contains a no-tone sound item, wherein K is an integer of at least a value of 2, $N_i$ is an integer of at least a value of 2 and i is an integer of a value of $0<i<K+1$; and choosing at least one desired sound tone item from said $N_i$ dedicated sound tone items or said no-tone sound item by the user using a setting item means thus facilitating said setting of said tasks.

According further to the first aspect of the invention, the step of said opening said multiple page dialog field on said one page may be performed optionally by default using said setting page means and wherein after said opening, the method further comprises the step of: determining if a further page with a page number j out of said K pages is needed to be open for completing said setting of the tasks, wherein j is an integer of a value of $0<j<K+1$ and $j\neq i$. Further, if it is determined that the further page needs to be opened, the method may further comprise the steps of: opening said further page with the page number j using said setting page means, wherein said further page contains $N_j$ further dedicated sound tone items with a further predetermined purpose presented only on said further page, and optionally contains a further no-tone sound item, wherein $N_j$ is an integer of at least a value of 2; and choosing at least one further desired sound tone item from said $N_j$ further dedicated sound tone items or said further no-tone sound item by the user using the setting item means thus further facilitating said setting of said tasks. Still further, said one page with the page number i of the K pages may contain a page icon area with K icons, each identifying a corresponding one of said K pages by a picture or by a text, respectively, for visually assisting the user for said opening of the further page. Yet still further, said opening of the further page may be performed by scrolling means optionally with arrow keys used as said setting page means.

Further according to the first aspect of the invention, the method may further comprise the step of: turning off all said $N_i$ dedicated sound tone items listed on said one page, if the no-tone sound item is chosen.

Still further according to the first aspect of the invention, the method may further comprise the step of: saving a selection of the at least one desired sound tone item by the communication device if said at least one desired sound tone item is chosen. Further, the method may further comprises the steps of: opening said multiple page dialog field on a still further page by the user using the setting page means, wherein said still further page contains P dedicated non-sound items with a predetermined purpose presented only on said one page, wherein P is an integer of at least a value of 2; and choosing at least one desired non-sound item from said P dedicated non-sound items by the user using the setting item means thus further facilitating said setting of said tasks.

According further to the first aspect of the invention, said K pages may contain a ringing tone page, a message page and an alarm page with K=3.

Still yet further according to the first aspect of the invention, the step of choosing said at least one desired sound tone item may include playing said at least one desired sound tone using said setting item means.

According still further to the first aspect of the invention, the communication device may be a mobile device or a mobile phone.

According yet still further to the first aspect of the invention, the setting page means may be a button, a number of buttons, a touch screen or a voice activator, or a combination thereof.

According further still to the first aspect of the invention, the setting item means can be a button, a number of buttons, a touch screen or a voice activator, or a combination thereof.

Yet still further according to the first aspect of the invention, the multiple page dialog field can be a display.

According to a second aspect of the invention, a communication device having a multiple page dialog capability for setting tasks, comprises: a multiple page dialog field, responsive to a setting page signal by displaying one page with a page number i of K pages, and to a setting item signal by choosing at least one desired sound tone item from $N_i$ dedicated sound tone items with a predetermined purpose and only contained on said one page or by choosing a no-tone sound item optionally contained on said one page thus facilitating said setting of said tasks, wherein K is an integer of at least a value of 2, $N_i$ is an integer of at least a value of 2 and i is an integer of a value $0<i<K+1$; setting page means, responsive to a page command signal from a user, for providing said setting page signal; and setting item means, responsive to an item command signal from the user, for providing said setting item signal.

According further to the second aspect of the invention, the setting page means and the setting item means may be combined in one block, setting page and item means.

Further according to the second aspect of the invention, all said $N_i$ dedicated sound tone items listed on said one page may be turned off if the no-tone sound item is chosen.

Still further according to the second aspect of the invention, while the open page is still open, said setting page means opens a further page with a page number j of the K pages, wherein j is an integer of a value $0<j<K+1$ and $j\neq i$. Further, said one page with the page number i of the K pages may contain a page icon area with K icons, each identifying a corresponding one of said K pages by a picture or by a text, respectively, for visually assisting the user for said opening of the further page. Still further, said selection may be performed by scrolling means optionally with arrow keys used as said setting page means.

According further to the second aspect of the invention, said K pages may contain a ringing tone page, a message page and an alarm page with K=3.

According still further to the second aspect of the invention, said setting item means may facilitate playing said at least one desired sound tone item during said choosing.

According further still to the second aspect of the invention, said device may be a mobile device or a mobile phone.

Yet still further according to the second aspect of the invention, the setting page means may be a button, a number of buttons, a touch screen or a voice activator, or a combination thereof.

According yet further still to the second aspect of the invention, the setting item means may be a button, a number of buttons, a touch screen or a voice activator, or a combination thereof.

Still yet further according to the second aspect of the invention, the multiple page dialog field may be a display.

According to a third aspect of the invention, a computer program product comprises: a computer readable storage structure embodying computer program code thereon for execution by a computer processor with said computer program code characterized in that it includes instructions for performing the steps of the first aspect of the invention indicated as being performed by the communication device.

According to a fourth aspect of the invention, a method for using a multiple page dialog field for setting tasks in a communication device, comprises the steps of: opening said multiple page dialog field on one page with a page number i of K pages by a user using a setting page means, wherein said one page contains $N_i$ dedicated items with a predetermined purpose and presented only on said one page, wherein K is an integer of at least a value of 2, $N_i$ is an integer of at least a value of 2 and i is an integer of a value of $0<i<K+1$; and choosing at least one desired item from said $N_i$ dedicated items by the user using a setting item means thus facilitating said setting of said tasks.

According to a fifth aspect of the invention, a communication device having a multiple page dialog capability for setting tasks, comprises: a multiple page dialog field, responsive to a setting page signal by displaying one page with a page number i of K pages, and to a setting item signal by choosing at least one desired item from $N_i$ dedicated items with a predetermined purpose and only contained on said one page thus facilitating said setting of said tasks, wherein K is an integer of at least a value of 2, $N_i$ is an integer of at least a value of 2 and i is an integer of a value $0<i<K+1$; setting page means, responsive to a page command signal from a user, for providing said setting page signal; and setting item means, responsive to an item command signal from the user, for providing said setting item signal.

Because the sounds are divided to different pages of a multipage dialog, the amount of scrolling reduces. The user also has a better picture about which sound is meant for which purpose because the sounds are combined in a particular page based on their purpose, according to the present invention. For example, it can be much easier to find "alarm-like sounds" from one page and "melodic tones" from another page.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

The present invention provides a novel methodology for using a multiple page dialog field for setting sound tasks in a communication device such as a mobile device or a mobile phone. The term "setting sound tasks" means setting specific sound tones for a particular purpose on a particular page or setting a no-tone for said purpose.

Figure 1A:
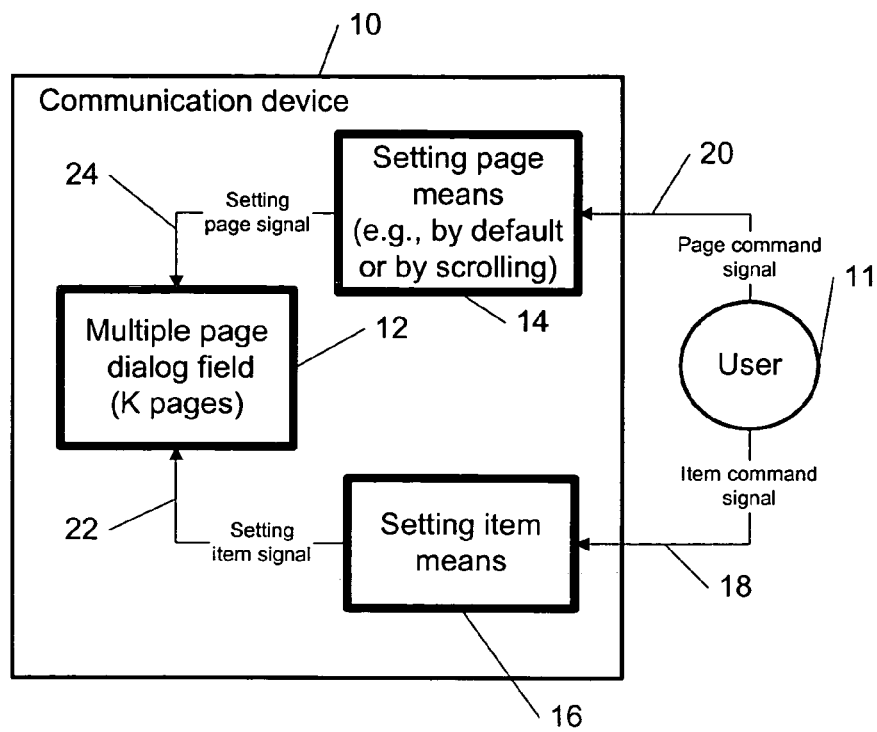
FIGS. 1a and 1b show examples of a block diagram of a communication device having a multiple page sound tone dialog capability, according to the present invention.
Figure 1B:
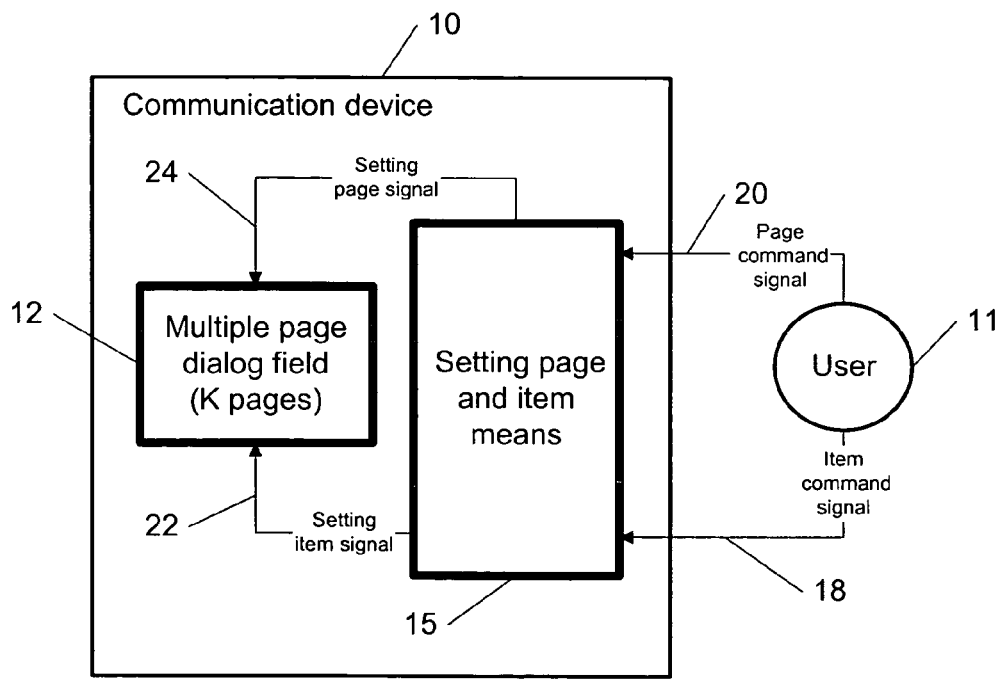

According to the present invention, the dialog/sounds are divided into multiple pages ("tabs"), for example, Ringing tones page, Message tones page, Alarms page, etc. The sounds are placed to different pages according to their purposes. The right page is opened using a setting page means, which, for example, can be implemented as a default setting depending on from where the dialog is opened. However, if the user wishes to select a ringing tone sound from another page, e.g., the "message tone page", it is allowed and possible to do by going directly to that page from the previous page using, for example, scrolling means with arrow keys ($\rightarrow$ or $\leftarrow$). Every page has a no-tone selection as well. FIGS. 1a and 1b shows one example among many others of a block diagram of a communication device 10 having a multiple page sound tone dialog capability, according to the present invention.

Figure 2:
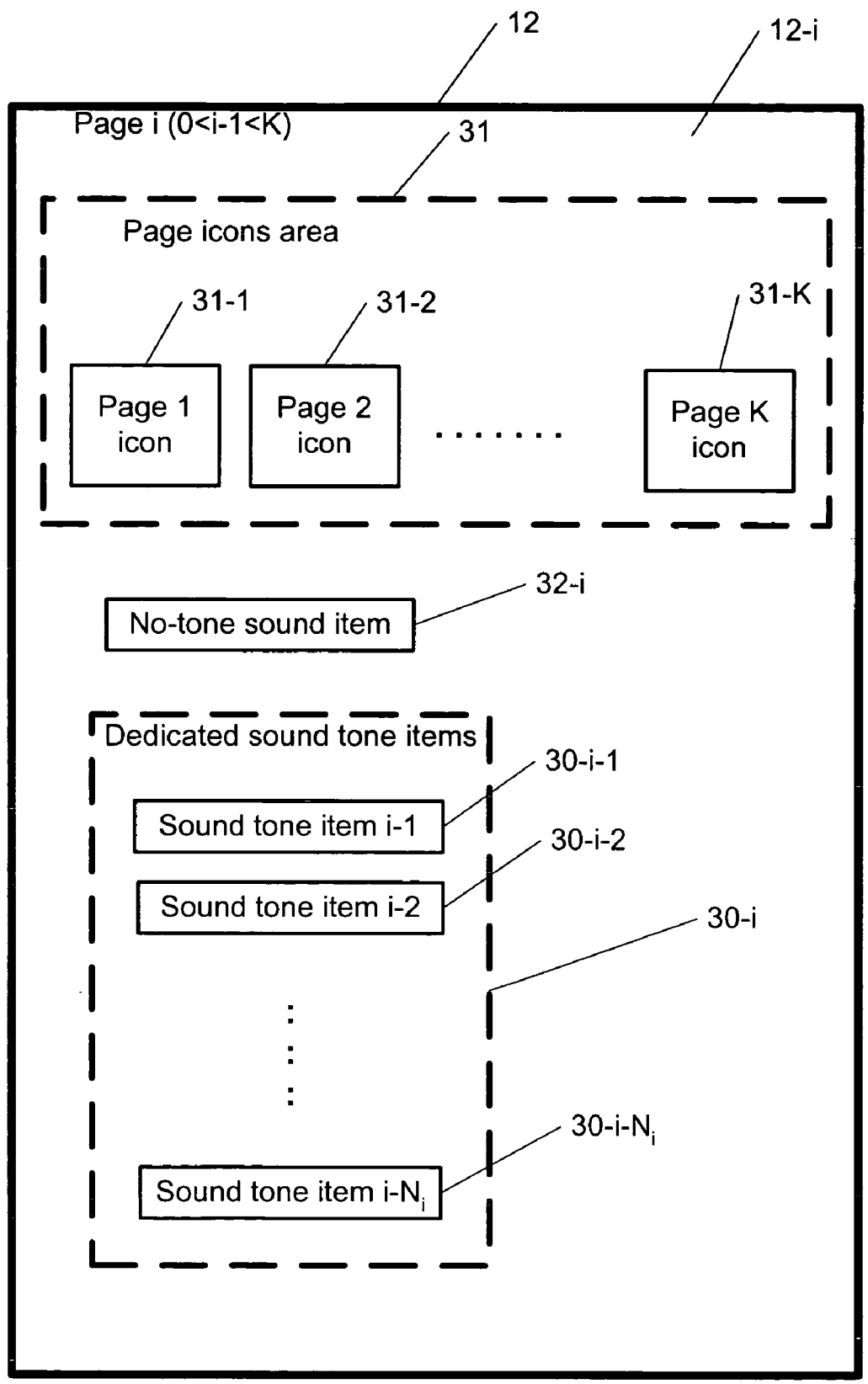
FIG. 2 shows an example of one page with dedicated sound tone items, which can be opened using multiple page sound tone dialog capability, according to the present invention.

A multiple page dialog field 12 is typically implemented as a display capable of displaying one page (or a tab) 12-i (see FIG. 2). Said one page 12-i is selected out of K other pages 12-1, 12-2, . . . , 12-K with different dedicated sound tone items having a different predetermined purpose for each page in response to a setting page signal 24 from a setting page means 14, wherein K is an integer of at least a value of two and i is an integer of a value of $0<i<K+1$. Said one page 12-i contains (see FIG. 2) $N_i$ dedicated sound tone items 30-i-1, 30-i-2, . . . , 30-i-$N_i$ with a predetermined purpose presented only on said one page, and also contains a no-tone sound item 32-i, wherein $N_i$ is an integer of at least a value of 2. Said setting page signal 24 is generated in response to a page command signal 20 from a user 11.

Said one page 12-i is opened using said setting page means 14 which can be implemented as a default setting depending on from where the dialog is opened. More specifically, the page that is active (i.e., opened) when the dialog is opened depends on from which field of the Profile Settings Dialog the multiple page dialog field is opened. That is if the dialog is opened from the "Received SMS (short message service)" field in the Profile Settings Dialog the "Message tones" page is opened as a default. Furthermore, if the field (e.g., page 12-i) from where the dialog was opened already has a sound tone item from the list of the sound tone items 30-i-1, 30-i-2, . . . , 30-i-N$_i$ as a selected value, then said sound tone item is selected (highlighted) when the dialog is opened. If the field (e.g., page 12-i) has another audio file (selected from the file system) as a value, the first sound tone item in the list 30-i-1 (i.e., the one located after no-tone sound item 32-i,) is selected (highlighted) when the dialog is opened on said page 12-i.

However, if the user wishes to select, e.g., a ringing tone sound from another page (not contained on said one page), it is allowed and possible to do so by going directly to that page (a further page 12-j, wherein j is an integer of a value of $0<j<K+1$ and $j \neq i$) from the previous page (said one page 12-i) using, for example, scrolling means optionally with arrow keys (→ or ←). To facilitate said scrolling, the one page 12-i (and all other K−1 pages) contains a page icon area 31 (see FIG. 2) with K icons 31-1, 31-2, . . . , 31-K, each identifying a corresponding one of said K pages 12-1, 12-2, . . . , 12-K by a picture or by a text, respectively, for visually assisting the user 11 for said opening of the further page.

For example, said K pages 12-1, 12-2, . . . , 12-K can be a ringing tone page, a message page and an alarm page (for K=3). If the one page 12-i contains a page icon area 31 (see FIG. 2), the number of pages K is limited to about 5 considering a practical size of the multiple page dialog field 12 which is limited by the dimensions of the communication device 10. However, the page number K can be further increased by using said setting page means 14 for those applications, according to the present invention, where said opening and/or scrolling of said pages do not require said page having the icon area 31.

Furthermore, after said one page 12-i is open, at least one desired sound tone item from said N$_i$ dedicated sound tone items 30-i-1, 30-i-2, . . . , 30-i-N$_i$ or the no-tone sound item 32-i is chosen using a setting item signal 22 from a setting item means 16. Said setting item signal 22 is generated in response to an item command signal 18 from the user 11. If the no-tone sound item 32-i is chosen, all said N$_i$ dedicated sound tone items 30-i-1, 30-i-2, . . . , 30-i-N$_i$ listed on said one page 12-i (see FIG. 2) are turned off. If, however, said at least one desired sound tone item is chosen, the communication device 10 completes and saves a selection of said at least one desired sound tone item. If after said selection is completed, another sound tone item from said N$_i$ dedicated sound tone items 30-i-1, 30-i-2, . . . , 30-i-N$_i$ can be chosen and selected as described above. Said choosing and selection can be implemented one sound tone item at a time sequentially according to the preferred embodiment of the present invention. According to the present invention it is noted that choosing said at least one desired sound tone item can include playing said at least one desired sound tone item using said setting item means 16.

Similarly, if the further page 12-j is opened, it contains N$_j$ further dedicated sound tone items 30-j-1, 30-j-2, . . . , 30j-N$_j$ with a further predetermined purpose and presented only on said further page 12-j, and it also contains a further no-tone sound item 32-j, wherein N$_j$ is an integer of at least a value of 2. Again similarly, at least one further desired sound tone item from said N$_j$ further dedicated sound tone items 30-j-1, 30-j-2, . . . , 30-j-N$_j$ or said further no-tone sound item 32-j is chosen using a setting item signal 22 from a setting item means 16. As mentioned above, the one page 12-j also contains a page icon area 31 with K icons 31-1, 31-2, . . . , 31-K.

There are many variations of the communication device 10 having a multiple page sound tone dialog capability shown in FIG. 1a, according to the present invention. For example, as shown in FIG. 2a, the setting page means 14 and the setting item means 16 can be combined in one block, setting page and item means 15. Furthermore, the communication device 10 can be a mobile device or a mobile phone. Moreover, the setting page means 14 can be implemented as a button, a number of buttons, a touch screen or a voice activator, or a combination thereof. Similarly, the setting item means 16 can be implemented as a button, a number of buttons, a touch screen or a voice activator, or a combination thereof. Furthermore, the same principle of the multiple page dialog, according to the present invention, can be applied to placing non-sound items (e.g., security items, network services items, etc.) on separate pages according to their purposes and using similar selection process. In that regard, according to the present invention, the sound tasks referred to above can be interpreted in a broader sense as tasks for setting both sound and non-sound tasks for a particular purpose on a particular page of a multiple page dialog field.

FIG. 2 shows one example among others of one page 12-i with dedicated sound tone items, which can be opened using multiple page sound tone dialog capability, according to the present invention.

As discussed above said one page 12-i contains N$_i$ dedicated sound tone items 30-i-1, 30-i-2, . . . , 30-i-N$_i$ with a predetermined purpose presented only on said one page, and contains a no-tone sound item 32-i, wherein N$_i$ is an integer of at least a value of 2. In addition, in order to facilitate scrolling to the further page 12-j, the one page 12-i can contain a page icon area 31 (see FIG. 2) with K icons 31-1, 31-2, . . . , 31-K, each identifying a corresponding one of said K pages 12-1, 12-2, . . . , 12-K by a picture or by a text, respectively, for visually assisting the user 11 for identifying the currently opened page and for opening of the further page.

Figure 3:
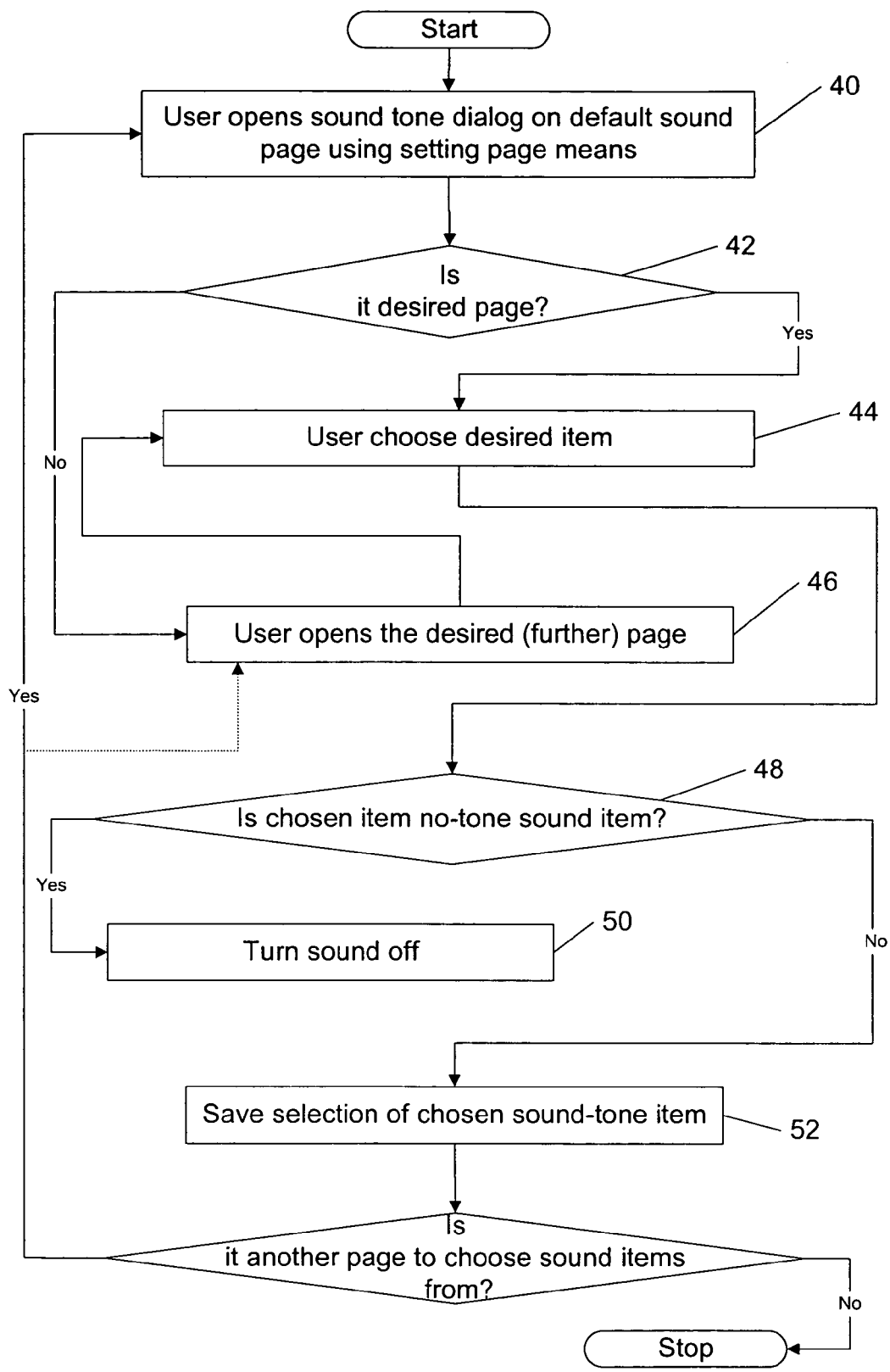
FIG. 3 shows an example of a flow chart demonstrating a performance of a communication device having a multiple page sound tone dialog capability, according to the present invention.

FIG. 3 shows an example of a flow chart demonstrating a performance of a communication device having a multiple page sound tone dialog capability, according to the present invention.

The flow chart of FIG. 3 represents only one possible scenario among others. In a method according to the present invention, in a first step 40, the user 11 opens said multiple page dialog field 12 for setting sound tasks in the communication device 10 on said one page 12-i (e.g., a default page) with the page number i of said K pages 12-1, 12-2, . . . , 12-K using said setting page signal 24 from the setting page means 14 or from the setting page and item means 15, wherein said setting page signal 24 is sent in response to the page command signal 20 from the user 11.

In a next step 42, it is ascertained by the user 11 whether the opened one page N-i is a desired (right) page. If that is the case, in a next step 44 at least one desired sound tone item from said N$_i$ dedicated sound tone items 30-i-1, 30-i-2, . . . , 30-i-N$_i$ or the no-tone sound item 32-i is chosen using a setting item signal 22 from a setting item means 16. Said setting item signal 22 is generated in response to an item command signal 18 from the user 11. If however, the opened one page N-i is not the desired (right) page, in a next step 46, the user 11 opens said desired (further) page 12-j. As described above, this can be done from the previous page (said one page 12-i) using, for example, scrolling means optionally with arrow keys (→ or ←). To facilitate said scrolling, the one page 12-i contains the page icon area 31 with K icons 31-1, 31-2, ..., 31-K, each identifying the corresponding one of said K pages 12-1, 12-2, ..., 12-K by the picture or by the text, respectively, for visually assisting the user 11 for making said opening of the desired further page 12-j. The selection of the further (desired) page 12-i is followed by the step 44 as described above.

In a next step 48 (after step 44), it is ascertained by the user 11 whether the chosen said item is the no-tone sound item. If that is the case, in a next step 50, all said $N_i$ dedicated sound tone items 30-i-1, 30-i-2, ..., 30-i-$N_i$ (or similarly all said $N_j$ further dedicated sound tone items 30-j-1, 30-j-2, ..., 30-j-$N_j$ listed on said further page 12-j) are turned off. If, however, the chosen item is not the no-tone sound item, in a next step 52, the communication device 10 completes and saves the selection of said at least one desired sound tone item (or said at least one further desired sound tone item). At this point the dailog page can be closed, according to the preferred embodiment of the present invention.

Finally, in a next step 54, it is ascertained by the user 11 whether there is a need to open another page to set the sound task. If that is not the case, the process stops. If however, at least one more sound page is to be opened, the process goes to step 40 (if the dialog page is closed) or optionally to step 46 (if the dialog page is not closed).

As explained above, the invention provides both a method and corresponding equipment consisting of various modules providing the functionality for performing the steps of the method. The modules may be implemented as hardware, or may be implemented as software or firmware for execution by a processor. In particular, in the case of firmware or software, the invention can be provided as a computer program product including a computer readable storage structure embodying computer program code, i.e., the software or firmware thereon for execution by a computer processor (e.g., provided with the communication device 10).

What is claimed is:

1. A method for using a multiple page dialog field for setting tasks in a communication device, wherein said multiple page dialog field comprises K pages for setting sound tone tasks, the method comprises the steps of:
   opening said multiple page dialog field on one page with a page number i of said K pages using a setting page means, wherein said one page comprises at least two sound tone items out of:
      a) $N_i$ dedicated sound tone items with a predetermined purpose and presented only on said one page, and
      b) a no-tone sound item,
   wherein K is an integer at least a value of 2, $N_i$ is an integer of at least a value of 2 and i is an integer of a value of $0<i<K+1$ and wherein each of said K pages comprises at least two dedicated sound tone items, and all dedicated sound tone items presented on said each page have a unique predetermined purpose presented only on said each page; and
   choosing at least one desired sound tone item from said at least two sound tone items using a setting item means thus facilitating said setting of said tasks,
   wherein said one page with the page number i of the K pages contains a page icon area with K icons, each identifying a corresponding one of said K pages by a picture or by a text, respectively, for visually assisting the user for said opening of a further page.

2. The method of claim 1, wherein the method further comprises the step of:
   determining if the further page with a page number j out of said K pages is needed to be open for completing said setting of the tasks, wherein j is an integer of a value of $0<j<K+1$ and $j \neq i$.

3. The method of claim 2, wherein if it is determined that the further, page needs to be opened, the method further comprises the steps of:
   opening said further page with the page number j using said setting page means, wherein said further page comprises at least two further sound tone items out of:
      a) $N_j$ dedicated sound tone items with a further predetermined purpose and presented only on said further one page, and
      b) a further no-tone sound item,
   wherein $N_j$ is an integer of at least a value of 2; and
   choosing at least one further desired sound tone item from said at least two further sound tone items using the setting item means thus further facilitating said setting of said tasks.

4. The method of claim 3, wherein said opening of the further page is performed by scrolling means optionally with arrow keys used as said setting page means.

5. The method of claim 1, further comprising the step of:
   turning off all said $N_i$ dedicated sound tone items listed on said one page, if the no-tone sound item is chosen.

6. The method of claim 1, further comprising the step of:
   saving a selection of the at least one desired sound tone item by the communication device if said at least one desired sound tone item is chosen.

7. The method of claim 6, wherein the method further comprising the steps of:
   opening said multiple page dialog field on a still further page by the user using the setting page means, wherein said still further page contains P dedicated non-sound items with a predetermined purpose presented only on said one page, wherein P is an integer of at least a value of 2; and
   choosing at least one desired non-sound item from said P dedicated non-sound items using the setting item means thus further facilitating said setting of said tasks.

8. The method of claim 1, wherein said K pages contain a ringing tone page, a message tone page and an alarm tone page with K=3.

9. The method of claim 1, wherein the step of choosing said at least one desired sound tone item includes playing said at least one desired sound tone using said setting item means.

10. The method of claim 1, wherein the communication device is a mobile device or a mobile phone.

11. The method of claim 1, wherein the setting page means or a button, a number of buttons, a touch screen or a voice activator, or a combination thereof.

12. The method of claim 1, wherein the setting item means is a button, a number of buttons, a touch screen or a voice activator, or a combination thereof.

13. The method of claim 1, wherein the multiple page dialog field is a display.

14. A computer program product comprising: a computer readable storage structure embodying computer program code thereon for execution by a computer processor with said computer program code characterized in that it includes instructions for performing the steps of the method of claim 1 indicated as being performed by the communication device.

15. The method of claim 1, wherein the step of said opening said multiple page dialog field on said one page is performed by default using said setting page means.

16. A communication device having a multiple page dialog capability for setting tasks, comprising:
a multiple page dialog field, comprises K pages for setting sound tone tasks, responsive to a setting page signal by displaying one page with a page number i of said K pages and comprising at least two sound tone items out of:
a) Ni dedicated sound tone items with a predetermined purpose and presented only on said one page, and
b) a no-tone sound item,
and responsive to a setting item signal by choosing at least one desired sound tone item out of at least two sound tone items, thus facilitating said setting of said tasks, wherein K is an integer of at least a value of 2, Ni is an integer of at least a value 2 and i is an integer of a value $0<i<K+1$;
setting page means, responsive to a page command signal from a user, for providing said setting page signal; and
setting item means, responsive to an item command signal from the user, for providing said setting item signal,
wherein each of said K pages comprises at least two dedicated sound tone items, and all dedicated sound tone items presented on said each page have a unique predetermined purpose presented only on said each page, and
wherein said one page with the page number i of the K pages contains a page icon area with K icons, each identifying a corresponding one of said K pages by a picture or by a text, respectively, for visually assisting the user for said opening of a further page.

17. The communication device of claim 16, wherein the setting page means and the setting item means are combined in one block, setting page and item means.

18. The communication device of claim 16, wherein all said $N_i$ dedicated sound tone items listed on said one page are turned off if the no-tone sound item is chosen.

19. The communication device of claim 16 wherein, while the open page is still open, said setting page means opens the further page with a page number j of the K pages, wherein is an integer of a value $0<j<K+1$ and $j \neq i$, wherein said further page comprises at least two further sound tone items out of;
a) Nj dedicated sound tone items with a further predetermined purpose and presented only on said further one page, and
b) a further no-tone sound item.

20. The communication device of claim 19, wherein said selection is performed by scrolling means optionally with arrow keys used as said setting page means.

21. The communication device of claim 16, wherein said K pages contain a ringing tone page, a message tone page and an alarm tone page with K=3.

22. The communication device of claim 16, wherein said setting item means facilitate playing said at least one desired sound tone item during said choosing.

23. The communication device of claim 16, wherein said device is a mobile device or a mobile phone.

24. The communication device of claim 16, wherein the setting page means is a button, a number of buttons, a touch screen or a voice activator, or a combination thereof.

25. The communication device of claim 16, wherein the setting item means is a button, a number of buttons, a touch screen or a voice activator, or a combination thereof.

26. The communication device of claim 16, wherein the multiple page dialog field is a display.

* * * * *

UNITED STATES PATENT AND TRADEMARK OFFICE
CERTIFICATE OF CORRECTION

| | | |
|---|---|---|
| PATENT NO. | : 7,072,694 B2 | Page 1 of 1 |
| APPLICATION NO. | : 10/785425 | |
| DATED | : July 4, 2006 | |
| INVENTOR(S) | : Laura Lehto | |

It is certified that error appears in the above-identified patent and that said Letters Patent is hereby corrected as shown below:

In the title after "DIALOG", --IN-- should be inserted.

In column 8, line 16, claim 3, line 2 after "further", "","" should be deleted.

In column 10, line 11, claim 19, line 3 after "wherein", --j-- should be inserted.

Signed and Sealed this

Sixteenth Day of October, 2007

JON W. DUDAS
*Director of the United States Patent and Trademark Office*